United States Patent Office 3,694,371
Patented Sept. 26, 1972

3,694,371
HOMOGENEOUS PRECIPITATION OF ALKALINE-EARTH METAL HALOPHOSPHATE PHOSPHORS
Armand J. Panson and Roswell J. Ruka, Pittsburgh, Pa., assignors to Westinghouse Electric Corporation, Pittsburgh, Pa.
No Drawing. Filed Jan. 26, 1971, Ser. No. 109,988
Int. Cl. C09k 1/36
U.S. Cl. 252—301.4 P      5 Claims

ABSTRACT OF THE DISCLOSURE

A method of preparing alkaline-earth metal halophosphate phosphor is detailed. The method comprises first homogeneously precipitating the apatite-structured activator-doped alkaline-earth metal and halogen containing phosphate, and then heating this precipitate to optimize its luminescence. The homogeneous precipitation is effected by incorporating the alkaline-erath metal into solution as an alkaline-earth metal complex which is readily dissociated upon heating, and by heating the resulting solution to dissociate the complex and effect formation of the precipitate.

BACKGROUND OF THE INVENTION

This invention relates to a method of preparing alkaline-earth metal halophosphate phosphors. The standard preparation for halophosphate phosphors is to prepare a raw mix of the various constituents and to fire this raw mix to incorporate the activator elements into the basic matrix, while simultaneously forming the matrix composition. The resultant product of this standard preparation can be a non-homogeneous mixture. The solid state firing technique is a time consuming and less than ideal procedure.

Attempts at preparing basic halophosphate matrix by precipitation have met with mixed results. In copending application Ser. No. 664,938, filed Sept. 1, 1967, now U.S. Pat. 3,538,014, dated Nov. 3, 1970, owned by the assignee of the present invention, is disclosed a method of producing calcium phosphate halide phosphor by a precipitation process. This process involves suspending prerequisite phosphor constituents in separate solutions, with the calcium constituent being contained in a basic solution, and the phosphate radical containing compound being included in an acidic solution. The solutions were then admixed with an ammoniacal calcium chloride solution, which raised the pH of the solution to thereby precipitate the phosphor. In copending application, Ser. No. 71,204, filed Sept. 10, 1970 by the present inventors, and owned by the assignee of the present invention, is disclosed another precipitation technique for preparing halophosphate phosphor.

While homogeneous precipitation methods are well known for carrying out inorganic precipitation reactions, these methods generally utilize an oxidation of a complexing agent to release a reactant. This oxidation process may oxidize the activator dopants which must be included in a phosphor composition in a desired valence state. For the halophosphate phosphors, the manganese activator valence state desired is generally plus two, and an oxidation process would make it difficult to maintain the desired valence state. In most oxidation processes the complexing agent is destroyed, which rules out the economics of a recycling of this agent in the precipitation preparation of alkaline earth halophosphate phosphors. Other homogeneous precipitation techniques involve changes of pH by slow hydrolysis, of for example by hydrolysis of urea, upon an increase of temperature.

SUMMARY OF THE INVENTION

It has been discovered that alkaline-earth metal halophosphate matrix can be homogeneously precipitated from solution. All of the requisite reactants can be suspended in a single aqueous solution of a predetermined pH with the amounts of the constituents being at least sufficient to satisfy the atom ratio of the particular activator doped alkaline-earth metal halophosphate desired. The alkaline-earth metal is present in the solution in a readily dissociable alkaline-earth metal-organic complex. The alkaline-earth metal complex masks the reactivity of the alkaline-earth metal ions until the complex dissociates upon heating, whereby the aqueous alkaline-earth metal ions are then free to react. A precipitate is formed which essentially comprises metal activator and halide containing apatite structured alkaline-earth metal phosphate. The precipitate is readily separated from the solution, and heated to a predetermined temperature to optimize its luminescence.

It has been discovered that when the desired final product is apatite-structured calcium fluoro-chloro-phosphate phosphor, which when activated by antimony and manganese comprises the standard fluoroescent lamp halophosphate phosphor used today, fluorine is preferably excluded from the initial precipitate. When only chlorine is contained in the solution, and the pH is maintained above a value of about 6, the resultant precipitate consists essentially of manganese and antimony doped chlorine containing hydroxyapatite. The precipitate is separated from the solution and treated with a predetermined amount of fluoride ion containing solution to convert the precipitate to fluoro-chloro-apatite. Upon firing, a high quality halophosphate phosphor is produced. Alternatively, a doped fluoro-apatite precipitate may be formed initially, in which case chlorine may be incorporated by firing in a chlorine containing atmosphere.

The present method allows for control of the crystal size and character of the precipitate by controlling the pH, and the heating rate. The control of the pH of the solution during the process ensures the homogeneity of the resultant precipitate.

The alkaline-earth metal can be very effectively complexed in this process with selected amino-polycarboxylic acids. These acids when used as complexing agents have the property of being reversibly dissociable with temperature and may thus be recycled after the precipitant is removed for further usage. This results in a considerable production cost saving.

DESCRIPTION OF THE PREFERRED EMBODIMENTS

The method of the present invention can be best explained by way of an exemplary embodiment. A mixture containing the requisite constituents is prepared by admixing the following: 20 ml. of an aqueous solution of calcium-ethylene-diaminetetracetic acid complex having a pH of about 8, and which is 0.5 molar with respect to calcium: 2.4 ml. of an aqueous solution of phosphoric acid with the pH adjusted to between 6 and 7 with potassium hydroxide, the solution being 10 molar with respect to the phosphoric acid; 2 ml. of an aqueous solution which is $2.7 \times 10^{-3}$ molar with respect to potassium antimonyl tartrate contained therein; about 20 ml. of an aqueous solution which has about $2.7 \times 10^{-3}$ mole each of manganese acetate and sodium - ethylenediaminetetracetic acid dissolved therein; sufficient ammonium chloride to make the precipitating solution 2 molar with respect to the chloride; and sufficient potassium hydroxide to adjust the pH of the mixture to between 6 and 7. This mixture of the above constituents is placed in a vessel which can sustain a relatively high pressure of at least several atmospheres, and the solution heated for about 1 hour at preferably about 160° C. to dissociate the calcium metal complex, thus providing free calcium ions and thereby effecting formation of the precipitate. The precipitate is separated from the mother liquor by a filtration or a centrifuging process. The precipitate, which is manganese and antimony doped, chlorinated hydroxy-apatite is then heated to form a phosphor. The precipitate is preferably treated with a fluorine containing aqueous solution to incorporate fluorine. For example, the fluoridation may be achieved by slurry the precipitate in an aqueous solution containing ammonium fluoride in an amount of about 8 weight percent of the precipitate, with the pH adjusted to about 4 by adding hydrochloric acid. The slurry is stirred for about two hours at about 85° C. to accomplish incorporation of the fluorine. The solution volume is not critical and can be adjusted for convenient stirring. The precipitate is washed and dried and then fired from about 900–1200° C. to optimize the luminescent properties of the calcium halophosphate phosphor.

The thermal dissociation of the calcium ethylene-di-aminetetracetic (EDTA) is preferably carried out at a temperature of from about 160° to 180° C., which requires heating under pressure. The dissociation can be carried out with lower yield by merely heating the solution to about its boiling point, which under ambient atmosphere is at approximately 100° C. When the calcium ion is freed as a result of the thermal dissociation, the EDTA reacts with the solution without changing the pH. Thus, the solution pH is stabilized during the entire precipitation process. This insures formation of the desired apatite-structured phosphate.

Other aminopolycarboxylic acids such as nitrilotri-acetic acid (NTA), and cyclohexane dinitrilotetra-acetic acid, can be substituted for the EDTA utilized in the foregoing example.

In another embodiment of the invention, a calcium nitrilotriacetic acid solution is preprepared by dissolving 0.5 mole of nitrilotriacetic acid in 500 ml. of a 1 molar potassium hydroxide solution, to which is added 0.22 mole of CaHPO$_4$. About 50 ml. of the calcium nitrilotriacetic acid solution is added to the precipitation container. To this container is added about 2.4 ml. of a solution of H$_3$PO$_4$+KOH which is 10 molar with respect to the H$_3$PO$_4$, with the pH being above about 8, 8 ml. of a 0.3 molar aqueous potassium fluoride solution, 2 ml. of an aqueous solution of potassium antimony tartrate

(KSbOC$_4$H$_4$O$_6$)

which is 2.7×10$^{-3}$ molar with respect to the antimony. A manganese nitrilotriacetic acid complex solution is prepared by dissolving manganese acetate in a nitrilotriacetic acid solution which is adjusted to a pH of about 8 with potassium hydroxide to provide a 0.17 molar solution of manganese nitrilotriacetic acid complex. About 4 ml. of this manganese containing solution is admixed with the other precipitation constituents, and the mixture is heated to about 90° C. for one hour under an inert atmosphere. The resultant precipitate is calcium fluoro-apatite, which is readily separated from the solution, washed and dried. The precipitate can be heated as such to optimize its luminescence, or is preferably admixed with a readily volatilizable chloride compound such as NH$_4$Cl and heated to optimize its luminescence. For example, about 5 weight percent addition of NH$_4$Cl to the firing, which is again at from about 900–1200° C. The precipitate will effect the desired chlorination during amount of ammonium chloride is not critical, and the furnace and firing conditions affect the preferred amount.

In the foregoing example, calcium can of course be substituted for by magnesium, strontium and/or barium in whole or in part. The calcium and strontium halophosphate phosphors in general provide the best luminescence. Other supplemental constituents can be included in the initial solution, such as cadmium. The particular activating constituents used in the example, i.e., manganese and antimony are the most commonly employed activators for halophosphate phosphor, but other activators such as divalent europium can be utilized.

The pH value of the solution can be widely varied, including using a basic solution to achieve a desired crystallinity and crystal size of the precipitate. The pH value of the solution is preferably from about 2 to about 7 when manganese and antimoony are the metallic activator constituents. This is to insure the incorporation of these metallic activators in the proper valence state in the final phosphor.

It has been found desirable to include an amount of phosphate radical in the precipitating solution which is in excess of the amount needed to satisfy the alkaline-earth metal halophosphate formulation, in order to facilitate formation of halophosphate. An excess of two to four times the stoichiometrically required phosphate radical content has been found advantageous.

The aminopolycarbooxylic acids used in complexing the alkaline-earth metal are preferably reversibly dissociable with changing temperature. The complexing agent is then recoverable after the precipitate is removed from the mother liquor, and may be reutilized in a continuous precipitation process. The use of nitrilotriacetic acid (NTA) is of advantage because of a relatively lower stability constant for manganese with NTA, which allows a lower manganese solution concentration to be used while still ensuring incorporation of sufficient manganese in the precipitate. The reaction process also proceeds more rapidly at a lower temperature for NTA solution, which is an advantage in a continuous process.

It has been discovered that when the precipitating solution contains both fluorine and chlorine, that the precipitate will include only the fluorine. The preferential precipitation of the fluorine as apatite-structured fluoro-phosphate means that when a fluoro-chlorophosphate is the desired final phosphor product, the chlorine must be added to the precipitate before or during the heating process which opitmizes luminescence. The chlorine is preferably added to the precipitated fluoro-phosphate by including a predetermined amount of readily volatilizable compound, such as NH$_4$Cl with the precipitate and then firing the mixture. In preparing a fluoro-chlorophosphate phosphor directly from solution one preferably excludes fluorine from the precipitating solution, and includes chlorine as the halogen constituent while main taining the solution pH at greater than 6 to yield a chlorine containing hydroxylapatite. The chlorine, which most likely is incorporated on hydroxyl radical sites, in the resultant precipitate of hydroxy-apatite is proportional to the chlorine concentration in solution. As an example, a chlorine concentration of 1.5 moles per liter yielded a product with about 5 percent of the hydroxyl sites occupied by chlorine, about 2.5 moles per liter chlorine concentration yielded approximately 8 percent chlorine occupied hydroxyl sites. The fluorine can then be incorporated by treating the precipitate with an aqueous fluoride containing solution, such as ammonium fluoride dissolved in distilled water, to convert the precipitate to fluoro-chlorophosphate.

The pH value of the precipitating solution can be widely varied, and can in fact be basic. The solution should not be too acidic, i.e. below about pH 2, otherwise, acid phosphate may also be precipitated. When the precipitation solution contains fluorine, essentially all of the precipitate will be fluoro-apatite even down to a pH value of about 2. When chlorine instead of fluorine is used in order to precipitate the chlorine hydroxy-apatite, it is preferred that the pH be kept about 6 or higher to prevent formation of acid phosphate.

We claim as our invention:

1. Method of preparing alkaline-earth metal halophosphate phosphor having an apatite crystalline structure comprising:
    (a) preparing an aqueous solution having a predetermined value of pH and containing the following as essential constituents: alkaline-earth metal ions in the form of an amonopolycarboxylic acid metal-organic complex which is readily and appreciably dissociated to provide alkaline-earth ions only at elevated temperatures; phosphate-containing compound which in solution will yield phosphate radical in such total amount as to provide at least that amount of phosphate required to react with all the phosphor metallic constituents present in compound form in said solution; chloride or fluoride ions in the form of readily dissociable compound, and predetermined amounts of selected metal activator in the form of dissociable compound; and wherein the respective atom ratios of total alkaline-earth metal, halide, and activator metal in said solution are substantially as desired in said phosphor;

(b) heating said solution to a temprature sufficient to dissociate said alkaline-earth metal complex to provide alkaline-earth metal ions to enact with said phosphate, whereby a precipitate forms essentially comprising metal activator, halide, and apatite structured alkaline-earth metal phosphate;

(c) separating said precipitate from solution and heating said precipitate to optimize its luminescence.

2. The method as specified in claim 1, wherein said aminopolycarboxylic acid is one of the group, ethylenediaminetetracetic acid, nitrilotriacetic acid, and cyclohexane dinitrilotetra-acetic acid.

3. The method as specified in claim 1, wherein when said halophosphate phosphor is fluoro-chlorophosphate, with a predetermined ratio of fluorine or chlorine, a fluoro-phosphate or chloro-phosphate is precipitated first and whichever is not contained in said separated precipitate, is then added to said separated precipitate to further optimize the luminescence of the resultant activated phosphor.

4. The method as specified in claim 3, wherein said fluorine is added to said separated chloride containing-precipitate by treating said precipitate with an aqueous solution containing fluoride ion.

5. The method as specified in claim 3, wherein said chloride is added to said separated fluoride containing-precipitate by providing a chloride containing atmosphere during said heating process.

References Cited
UNITED STATES PATENTS 3,538,014  11/1970  Wachtel _____ 252—301.4 P
3,575,876  4/1971  Piper _____ 252—301.4 P ROBERT D. EDMONDS, Primary Examiner